United States Patent
Wang et al.

(10) Patent No.: US 11,170,203 B2
(45) Date of Patent: Nov. 9, 2021

(54) TRAINING DATA GENERATION METHOD FOR HUMAN FACIAL RECOGNITION AND DATA GENERATION APPARATUS

(71) Applicant: National Central University, Taoyuan (TW)

(72) Inventors: Jia-Ching Wang, New Taipei (TW); Chien-Wei Yeh, Taoyuan (TW)

(73) Assignee: National Central University, Taoyuan (TW)

( * ) Notice: Subject to any disclaimer, the term of this patent is extended or adjusted under 35 U.S.C. 154(b) by 77 days.

(21) Appl. No.: 16/697,212

(22) Filed: Nov. 27, 2019

(65) Prior Publication Data
US 2021/0158020 A1 May 27, 2021

(51) Int. Cl.
*G06K 9/00* (2006.01)
*G06K 9/62* (2006.01)

(52) U.S. Cl.
CPC ....... *G06K 9/00255* (2013.01); *G06K 9/6256* (2013.01)

(58) Field of Classification Search
CPC .......................... G06K 9/00255; G06K 9/6256
USPC ....................................................... 382/118
See application file for complete search history.

(56) References Cited

U.S. PATENT DOCUMENTS

| 7,095,879 | B2* | 8/2006 | Yan | G06K 9/00288 345/419 |
| 8,363,951 | B2* | 1/2013 | Bigioi | G06K 9/00221 382/190 |
| 2006/0251298 | A1* | 11/2006 | Bronstein | G06K 9/00288 382/118 |
| 2007/0258627 | A1* | 11/2007 | Geng | G06K 9/6255 382/118 |
| 2009/0157707 | A1* | 6/2009 | Ito | G06K 9/00973 |
| 2019/0050632 | A1* | 2/2019 | Weng | G06F 17/15 |

FOREIGN PATENT DOCUMENTS

| CN | 109325994 | 2/2019 |
| CN | 110097035 | 8/2019 |
| CN | 110189248 | 8/2019 |
| TW | I452998 | 9/2014 |

OTHER PUBLICATIONS

"Office Action of Taiwan Counterpart Application", dated Jul. 31, 2020, p. 1-p. 6.

* cited by examiner

*Primary Examiner* — Juan A Torres
(74) *Attorney, Agent, or Firm* — JCIPRNET

(57) ABSTRACT

A training data generation method for human facial recognition and a data generation apparatus are provided. A large amount of virtual synthesized models are generated based on a face deformation model, where changes are made to face shapes, expressions, and/or angles to increase diversity of the training data. Experimental results show that the aforementioned training data may improve the accuracy of human face recognition.

10 Claims, 3 Drawing Sheets

TRAINING DATA GENERATION METHOD FOR HUMAN FACIAL RECOGNITION AND DATA GENERATION APPARATUS

BACKGROUND

Technical Field

The invention relates to a machine learning technology, and more particularly, relates to a training data generation method for human facial recognition and a data generation apparatus.

Description of Related Art

The machine learning technology is capable of learning from existing data and experiences to derive its operating rules and is one an important branch in the artificial intelligence (AI) technology. The machine learning technology may be used in extensive application fields, and the field of human facial recognition is the field where machine learning can be applied to deliver prominent effects. Human facial recognition is a non-invasive biometric recognition technology, and thereby is widely used by users. The human facial recognition may also be combined with researches in other fields to develop a variety of applications, for example, the surveillance field (e.g., border control and suspect tracking), the security field (e.g., system login and account security) and even the entertainment field (e.g., human-machine interaction and virtual reality), etc.

The commonly used machine learning frameworks include, for example, deep neural network (DNN), convolutional neural network (CNN), recurrent neural network (RNN), etc. In the present stage, CNN is used as the architecture foundation in most of the researches on human facial recognition.

It should be noted that an effect achieved by machine learning is related to the content and quantity of training data. However, it is quite challenging to collect huge amounts of data used for human facial recognition in various situations.

SUMMARY

The invention is directed to a training data generation method for human facial recognition and a data generation apparatus, which synthesize a large amount of virtual face data to expand data used for machine learning.

The invention provides a training data generation method for human facial recognition, and the method includes the following steps. A plurality of synthesized models are synthesized based on a face deformation model. Each of the synthesized models is changed to form a plurality of training data. The training data is used for machine learning training.

The invention further provides a data generation apparatus, which is adapted to generate training data used for human facial recognition. The data generation apparatus includes but is not limited to a memory and a processor. The memory is configured to record program codes. The processor is coupled to the memory and loads the program codes to execute following steps. A plurality of synthesized models are synthesized based on a face deformation model. Each of the synthesized models is changed to form a plurality of training data. The training data is used for machine learning training.

Based on the above description, in the embodiments of the invention, the training data generation method for human facial recognition and the data generation apparatus may generate different virtual synthesized models according to shapes, expressions, and/or a change of facing direction, which may effectively expand the training data used in machine learning and improve the effect of human facial recognition.

To make the aforementioned more comprehensible, several embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
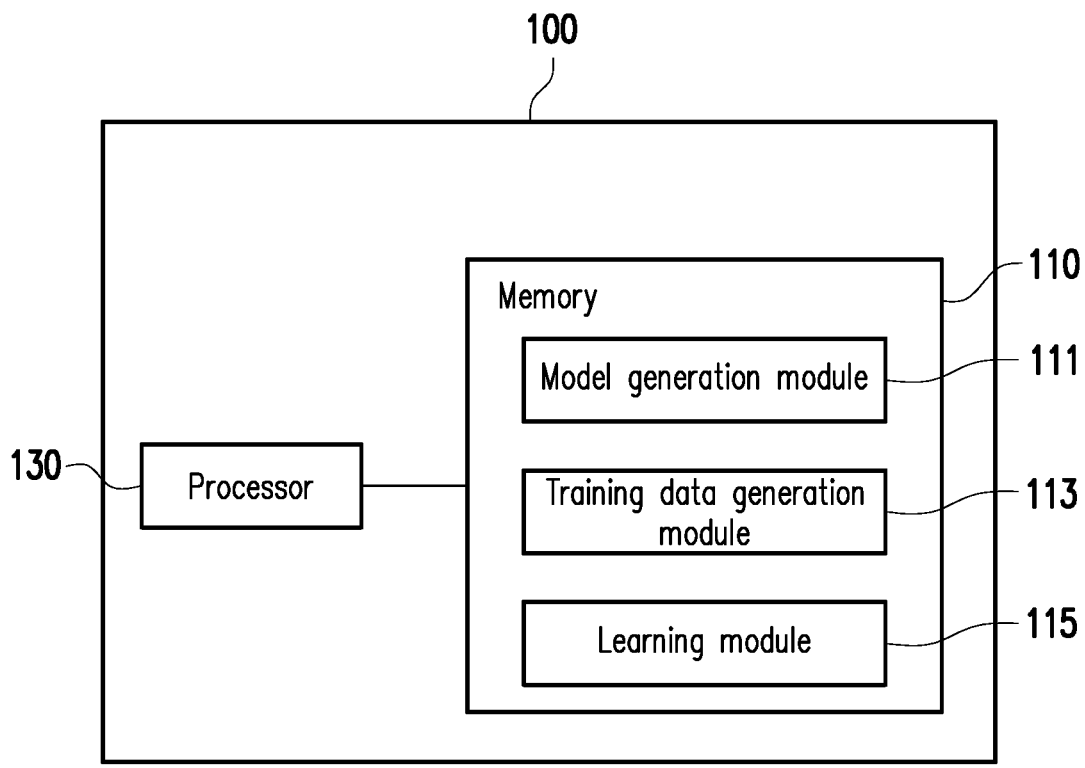
FIG. 1 is a block view of components of a data generation apparatus according to an embodiment of the invention.

FIG. 1 is a block view of components of a data generation apparatus 100 according to an embodiment of the invention. Referring to FIG. 1, the data generation apparatus 100 includes, but is not limited to, a memory 110 and a processor 130. The data generation apparatus 100 may be an electronic apparatus such as a mobile phone, a tablet PC, a desktop computer, a server, etc.

The memory 110 may be any type of a fixed or movable random access memory (RAM), a read-only memory (ROM), a flash memory, a hard disk drive (HDD), a solid-state drive (SSD), or a similar device or a combination of the foregoing devices. In the embodiments of the invention, the memory 110 is configured to store temporary or permanent data (for example, face images, scan results, face deformation models, synthesized models, training data, expression features, depth maps, real datasets, etc.), software modules (for example, a model generation module 111, a training data generation module 113, a learning module 115, etc.), or other files and data, and details thereof are to be described later.

The processor 130 is coupled to the memory 110, and the processor 130 may be a central processing unit (CPU) or a programmable microprocessor for general purposes or special purposes, a digital signal processor (DSP), a programmable controller, an application-specific integrated circuit (ASIC), or other similar devices or a combination of the foregoing devices. In the embodiments of the invention, the processor 130 is configured to execute all of operations of the data generation apparatus 100 and may load and execute various software modules, files, and data recorded in the memory 110.

In order to facilitate the understanding of an operation flow of the embodiments of the invention, several embodiments are provided below to describe a training data generation process of the embodiments of the invention in detail. In the following description, the method of the embodiments of the invention is introduced with reference to various components and modules of the data generation apparatus 100. The flow of the method may be adjusted according to actual needs, which is not limited by the invention.

Figure 2:
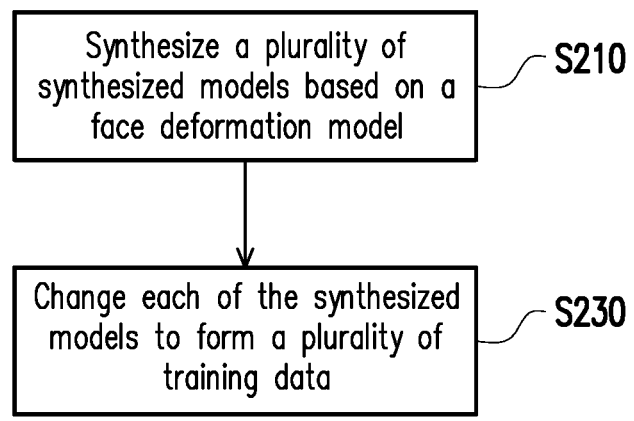
FIG. 2 is a flow chart of a training data generation method for human facial recognition according to an embodiment of the invention.

FIG. 2 is a flow chart of a training data generation method for human facial recognition according to an embodiment of the invention. Referring to FIG. 2, the processor 130 synthesizes a plurality of synthesized models based on a face deformation model through the model generation module 111 (step S210). To be specific, in machine learning training, in order to avoid over-fitting during the training, data augmentation may be adopted to deal with the aforementioned situation. In the image recognition technology, considering that a target object may be photographed in different environments, if learning may be performed for different environmental factors (such as orientation, location, brightness, etc.), it is possible to achieve an accurate recognition result. However, the environmental factors are often difficult to control. Therefore, data augmentation may be used to additionally synthesize fake data, so as to solve the problem of data insufficiency and facilitate training of a neural network to cope with different environments. One of the objectives of the embodiments of the invention is to generate synthesized data for human facial recognition learning.

The model generation module 111 may generate a face model based on a face reconstruction technology. The face reconstruction technology is to reconstruct a two-dimensional (2D) or three-dimensional (3D) model based on one or a plurality of inputted 2D or 3D images. The face reconstruction technology is, for example, reconstruction based on image information (for example, image brightness, edge information, linear perspective, color, etc.), reconstruction based on models (for example, triangular mesh, point cloud, etc.), and end-to-end reconstruction (for example, learning based on the neural network). It should be noted that the basic face model generation method is not limited by the invention.

Taking a general face model as an example, face information may be obtained through a scanner, and the general face model may be generated through computer graphics technology or modeling software, etc.

Taking the reconstruction based on models as an example, the face model may be defined as follows:

$$M=(S,T) \qquad (1),$$

where S is a shape vector, and T is a texture vector. The shape vector is defined as follows:

$$S=(X_1,Y_1,Z_1,X_2,Y_2,Z_2,\ldots,X_n,Y_n,Z_n)^T \qquad (2).$$

$X_1$, $Y_1$, $Z_1$, $X_2$, $Y_2$, $Z_2$, ..., $X_n$, $Y_n$, $Z_n$ are respectively 3D coordinate information of each vertex in the face model, and n is the number of vertices. The texture vector is defined as:

$$T=(R_1,G_1,B_1,R_2,G_2,B_2,\ldots,R_n,G_n,B_n)^T \qquad (3).$$

$R_1$, $G_1$, $B_1$, $R_2$, $G_2$, $B_2$, ..., $R_n$, $G_n$, $B_n$ are respectively red, green, and blue color information of each vertex in the face model. Each face model has its own corresponding shape vector and texture vector. It is assumed that there are two or more face models, the model generation module 111 may assign a weight to each of the face models, and then these face models may generate new face models after weighting operations (the weighting operations are performed on the shape vectors and the texture vectors respectively). It is known that by changing the weights corresponding to different face models, new face models may be generated. Next, based on the inputted 2D or 3D face images to match/fit the face models, the model reconstruction may then be completed.

In an embodiment, the model generation module 111 may further add an expression change to the shape vector in one or more face models. That is, a vertex position may be further adjusted based on expression information.

It should be noted that the face deformation model of the embodiment of the invention is generated based on a face scanning result (for example, the aforementioned model reconstruction method) and is a face model which may be used to adjust the position and/or color of one or more face vertices thereon. The face deformation model may be a Basel face model-2017 (BFM-2017), a Surrey face model or other face deformation models. Moreover, facial expressions used as a reference model may be a closed mouth, an open mouth, other expressions, or a combination thereof.

In an embodiment, the model generation module 111 may change the face shape of the face deformation model to form one or more synthesized models. Each of the synthesized models is defined as an individual. The model generation module 111 can change the aforementioned shape vectors to form different individuals.

For example, the BFM-2017 is a face deformation model that takes 200 3D face scans as model samples. An average face model may be obtained from the 200 face samples ($\overline{X}=\{\overline{X}_S, \overline{X}_T\}$, $\overline{X}_S$ is an average face shape vector and $\overline{X}_T$ is an average face texture vector). The average face shape vector $\overline{X}_S$ may serve as a reference for a face shape change:

$$X=\overline{X}_S+D_S\alpha \qquad (4).$$

X is the generated face shape, $\overline{X}_S$ is the average face shape vector in $\overline{X}$, $D_S$ is a multi-variability matrix obtained from the BFM-201 to represent the face shape change, and α is a combination parameter that controls $D_S$. Therefore, the parameter vector α of a length 199 may be used as a reference for synthesizing the individuals. The model generation module 111 may use a random number or a specific rule to generate the synthesized models of various face shapes to serve as the individuals (i.e., the synthesized models).

Figure 3:
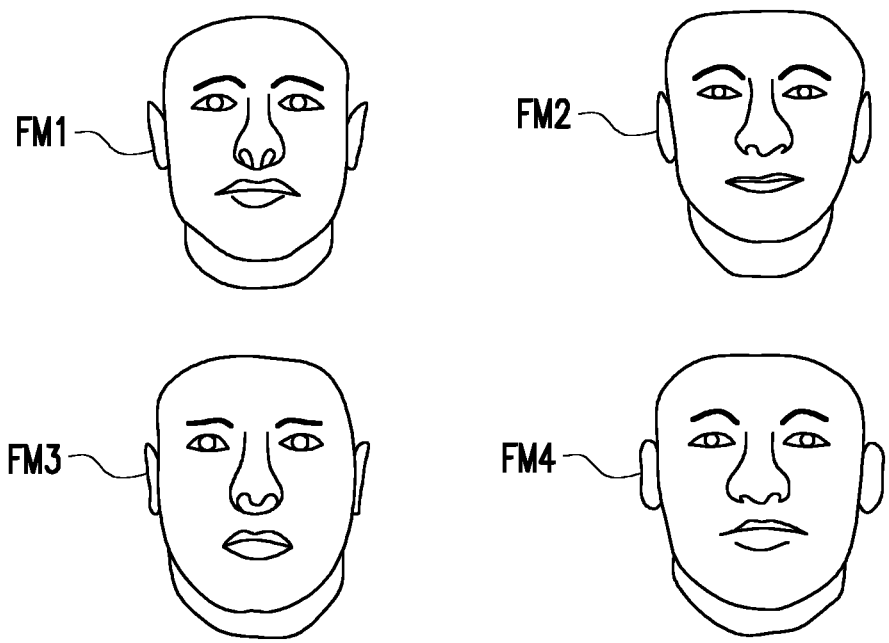
FIG. 3 is an example illustrating synthesized models of different shapes.

FIG. 3 is an example illustrating synthesized models of different shapes. Referring to FIG. 3, the faces shapes of the synthesized models FM1-FM4 are different.

Next, the model generation module 111 changes each of the synthesized models to form a plurality of training data (step S230). To be specific, the training data is used for machine learning training. In order to increase face data differences of the same individual, in an embodiment, the amount of data may be expanded through a plurality of expressions. In this way, over-fitting of the synthesized model caused by expressionless features may be prevented. The model generation module 111 may adjust the expression features of one or more synthesized models to change the facial expressions of the corresponding synthesized models. The model generation module 111 may change the position of one or more vertices on the synthesized model with reference to expression information (for example, a FaceWarehouse dataset or other datasets). Based on equation (5), a synthesized model having increased expression features is obtained as follows:

$$X_e=\overline{X}_S+D_S\alpha+D_e\beta \qquad (5).$$

$X_e$ is a synthesized model after adding an expression change. $D_e$ is change information of a facial expression obtained from the Fare-Warehouse dataset, a vector β is a parameter combination for controlling $D_e$, where a length of β is 100. The model generation module 111 may use a random number or a specific rule on the vector β to generate the synthesized models of various facial expressions.

Figure 4:
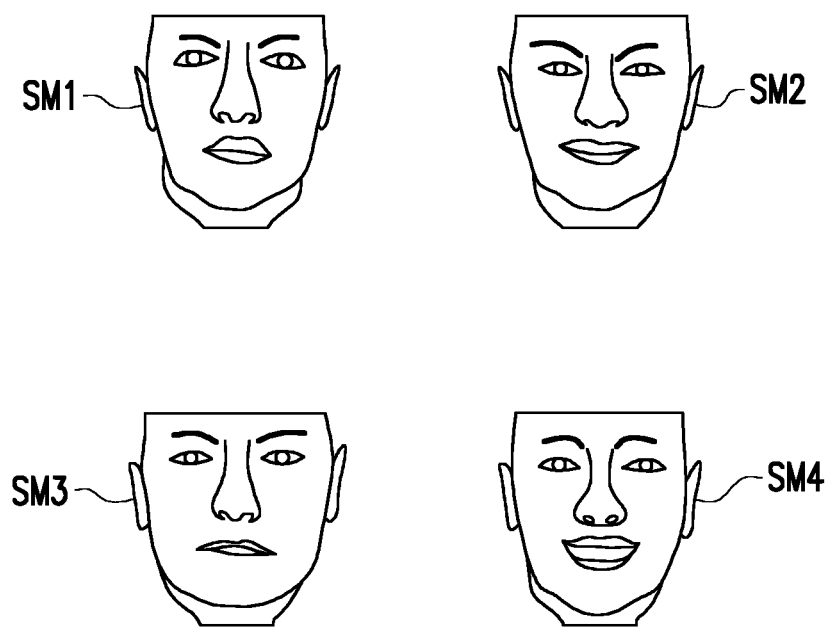
FIG. 4 is an example illustrating synthesized models of different expressions.

FIG. 4 is an example illustrating synthesized models of different expressions. Referring to FIG. 4, the synthesized models SM1-SM4 of different facial expressions may be formed based on the same individual.

In another embodiment, the model generation module 111 rotates one of the synthesized models to change the facing direction/pose of the synthesized model. To be specific, an angle change of the model may also enhance the data augmentation. Taking a 3D coordinate space as an example, the facing direction of a human face has six different adjustable angle parameters relative to an observer's perspective: yawing, pitching, rolling, and 3D translation of X, Y, and Z. If the position of the human face is required to be in the middle of an image, the 3D translation change may be neglected, but the invention is not limited thereto.

In the following description, rotation changes are made for yawing, pitching, and rolling. It is assumed that a rotation matrix R in the 3D space is used to change the coordinate points of the synthesized model:

$$R = R_z(\theta_z) R_y(\theta_y) R_x(\theta_x) R \in \mathbb{R}^{3 \times 3} \tag{6}$$

where $R_z$ is a yawing matrix (i.e., solely rotating around the Z axis at an angle $\theta_z$ in the space (assuming that the counter clockwise direction is positive)). At this time, the coordinate transformation of the 3D coordinate points only affects the X and Y planes, that is, the X and Y planes are rotated. The equation (6) is an expansion of $R_z(\theta_z)$:

$$R_z(\theta_z) = \begin{pmatrix} \cos\theta_z & -\sin\theta_z & 0 \\ \sin\theta_z & \cos\theta_z & 0 \\ 0 & 0 & 1 \end{pmatrix}. \tag{7}$$

$R_y$ is a pitch matrix Pitch (i.e., solely rotating around the Y axis at an angle $\theta_y$ in the space). At this time, the coordinate transformation of the 3D coordinate points only affects the X and Z planes, that is, the X and Z planes are rotated. An equation (8) is an expansion of $R_y(\theta_y)$:

$$R_y(\theta_y) = \begin{pmatrix} \cos\theta_y & 0 & \sin\theta_y \\ 0 & 1 & 0 \\ -\sin\theta_y & 0 & \cos\theta_y \end{pmatrix}. \tag{8}$$

Finally, $R_x$ is a rolling matrix (i.e., solely rotating around the X axis at an angle $\theta_x$ in the space). At this time, the coordinate transformation of the 3D coordinate points only affects the Y and Z planes, that is, the Y and Z planes are rotated. An equation (9) is an expansion of $R_x(\theta_x)$:

$$R_x(\theta_x) = \begin{pmatrix} 1 & 0 & 0 \\ 0 & \cos\theta_x & -\sin\theta_x \\ 0 & \sin\theta_x & \cos\theta_x \end{pmatrix}. \tag{9}$$

The model generation module 111 may randomly generate the rotation angles $\theta_z$, $\theta_y$, and $\theta_x$ and make the original synthesized models X and $X_e$ to perform a rotation change in the 3D space relative to a view point. For example, in equations (10) and (11), a rotated synthesized coordinate $X_r$ is expanded to a virtual synthesized dataset, so that increased angle variability is provided.

$$X_r = XR = XR_z(\theta_z) R_y(\theta_y) R_x(\theta_x) \tag{10}$$

$$X_r = X_e R = X_e R_z(\theta_z) R_y(\theta_y) R_x(\theta_x) \tag{11}$$

Figure 5:
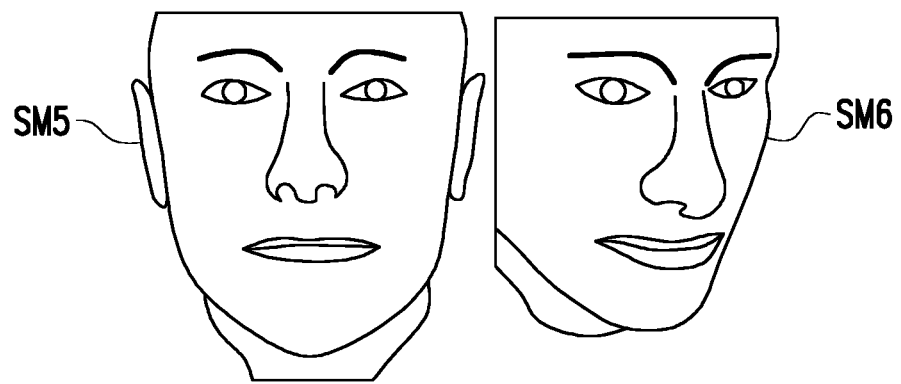
FIG. 5 is an example illustrating synthesized models of different facing directions.
Figure 5:
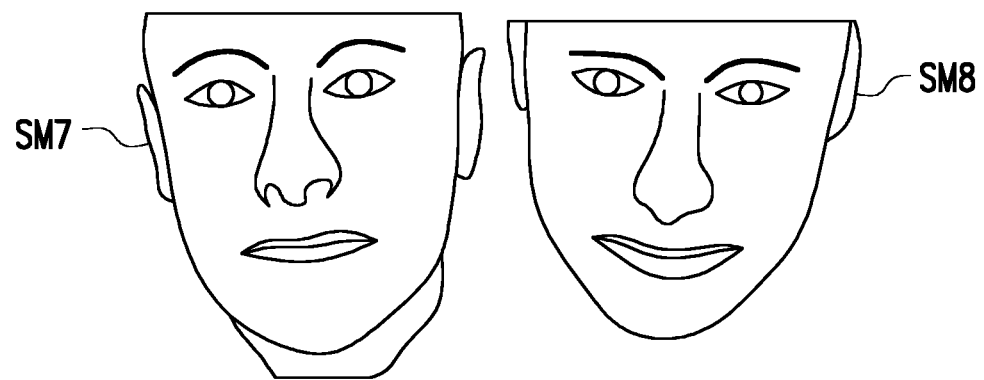

FIG. 5 is an example illustrating synthesized models of different facing directions. Referring to FIG. 5, synthesized models SM5-SM8 of different facing directions may be formed relative to a viewing angle based on the same individual.

In an embodiment, for the 3D face models, the training data generation module 113 may respectively transform the synthesized models into a plurality of depth maps and treat the depth maps as training data. The training data may be inputted to a feature vector learner for training. For example, the learning module 115 trains a neural network based on the training data. The feature vector learner may be a FaceNet framework, a DeepFace framework, an InsightFace framework, an Inception-ResNet v1 framework, or other frameworks.

Taking the Inception-ResNet framework as an example, an Inception module may solve the over-fitting situation caused by oversized models and provides the effect of improving computing efficiency. There are four basic components in the Inception module: 1×1 convolution, 3×3 convolution, 5×5 convolution, and 3×3 maximum pooling. The core idea of the Inception module is to combine the operation results of the four components on the channel: extracting information of different scales of the image through multiple convolution kernels to perform merging, so as to obtain a favorable feature of the image. On the other hand, residual learning network (ResNeT) may solve the problem of accuracy reduction of the training set of the deepened deep learning network. The ResNet adds an identity mapping connection mode in addition to the original residual mapping connection mode, so that the ResNet has two connection modes. When the network learning has reached an optimal state, connection mapping of a deeper network may be changed to 0. In this case, only the identity mapping is left, and the network is always in the optimal state. A network performance does not decrease as depth increases. The Inception-ResNet v1 includes three Inception-ResNet modules: an Inception-ResNet-A module, an Inception-ResNet-B module, and an Inception-ResNet-C module, and each of the modules uses the concept of Inception and ResNet. Moreover, these modules may be further adjusted. For example, an input size may be changed to 160×160×1, a Softmax function of a last layer may be removed, and one 1×1×128 convolution layer is added to be outputted as the feature vector.

In another embodiment, for the two-dimensional face model, the training data generation module 113 may use the facial features in the image as the training data.

In order to reduce the difference between the virtual synthesized dataset (obtained after changing the synthesized model and related to the training data) and the real dataset (generated based on the face scanning results), in an embodiment, the model generation module 111 may limit a range of the rotation change. For example, a yawing change is limited to [−90°,90°], a pitch change is limited to [−30°,30°], and a rolling change is limited to [−15°,15°]. It should be noted that the model generation module 111 may still rotate randomly within the above limits.

In another embodiment, the training data generation module 113 may generate those training data based on both the changed synthesized models and the real datasets. To be specific, the virtual synthesized data formed by the changed synthesized models may be combined with the real datasets, or the virtual synthesized datasets may be used as the training datasets and the real datasets may be used to adjust the synthesized models.

In another embodiment, the training data generation module 113 may select a part of the data from the real dataset, train the feature vector learner through the virtual synthesized dataset, and use a part of the real data for model adjustment. In this way, accuracy is improved as well. For example, the training data generation module 113 only selects only a quarter of the real data.

In still another embodiment, the training data generation module 113 may increase the number of the synthesized models, for example, double the synthesized models. In this case, a verification result may approach the real dataset by increasing the amount of data.

In summary, in the embodiments of the invention, the training data generation method for human facial recognition and the data generation apparatus may reconstruct the face models based on the face scanning results and accordingly generate the face deformation model. Moreover, the synthesized models are formed after the shape of the face deformation model is changed. Further, expressions and/or facing directions of the synthesized models may be changed for data augmentation. On the other hand, in order to improve recognition accuracy, the rotation angle of the virtual synthesized data may be limited, the real dataset may be provided for auxiliary purposes, and/or the real dataset provided for auxiliary purposes may be deleted.

It will be apparent to those skilled in the art that various modifications and variations can be made to the disclosed embodiments without departing from the scope or spirit of the invention. In view of the foregoing, it is intended that the invention covers modifications and variations provided they fall within the scope of the following claims and their equivalents.

What is claimed is:

1. A training data generation method for human facial recognition, comprising:
    synthesizing a plurality of synthesized models based on a face deformation model; and
    changing the plurality of synthesized models to form a plurality of training data, wherein the plurality of training data are used for machine learning training,
    wherein the step of changing the plurality of synthesized models to form the plurality of training data comprises:
        performing a rotation operation on at least one synthesized model in the plurality of synthesized models to change a facing direction of the at least one synthesized model,
        wherein the at least one synthesized model is rotated using a specific angle range under the rotation operation to generate the plurality of training data, and the specific angle range for generating the plurality of training data includes a yawing angle of the at least one synthesized model in a range from −90 degrees to 90 degrees, a pitch angle of the at least one synthesized model in a range from −30 degrees to 30 degrees, and a rolling angle of the at least one synthesized model in a range from −15 degrees to 15 degrees.

2. The training data generation method for human facial recognition as claimed in claim 1, wherein the step of synthesizing the synthesized models based on the face deformation model comprises:
    changing a face shape of the face deformation model to form the synthesized models,
    wherein the face deformation model is generated based on a face scanning result.

3. The training data generation method for human facial recognition as claimed in claim 1, wherein the step of changing the plurality of synthesized models to form the plurality of training data comprises:
    adjusting an expression feature of one of the synthesized models to change a facial expression of the synthesized model.

4. The training data generation method for human facial recognition as claimed in claim 1, wherein the step of synthesizing the synthesized models based on the face deformation model comprises:
    respectively transforming the synthesized models into a plurality of depth maps, and treating the depth maps as the plurality of training data, wherein the plurality of training data are inputted to a feature vector learner for training.

5. The training data generation method for human facial recognition as claimed in claim 1, wherein the step of synthesizing the synthesized models based on the face deformation model comprises:
    forming the plurality of training data based on both a changed synthesized model and a real dataset, wherein the real dataset is generated based on a face scanning result.

6. A data generation apparatus, adapted to generate training data used for human facial recognition, the data generation apparatus comprising:
    a memory, recording at least one program code; and
    a processor, coupled to the memory and loading the at least one program code to execute:
        synthesizing a plurality of synthesized models based on a face deformation model; and
        changing the plurality of synthesized models to form a plurality of training data, wherein the plurality of training data are used for machine learning training,
        wherein the processor is further configured to execute:
            performing a rotation operation on at least one synthesized model in the plurality of synthesized models to change a facing direction of the at least one synthesized model,
            wherein the at least one synthesized model is rotated using a specific angle range under the rotation operation to generate the plurality of training data, and the specific angle range for generating the plurality of training data includes a yawing angle of the at least one synthesized model in a range from −90 degrees to 90 degrees, a pitch angle of the at least one synthesized model in a range from −30 degrees to 30 degrees, and a rolling angle of the at least one synthesized model in a range from −15 degrees to 15 degrees.

7. The data generation apparatus as claimed in claim 6, wherein the processor is further configured to execute:
    changing a face shape of the face deformation model to form the synthesized models, wherein the face deformation model is generated based on a face scanning result.

8. The data generation apparatus as claimed in claim 6, wherein the processor is further configured to execute:
    adjusting an expression feature of one of the synthesized models to change a facial expression of the synthesized model.

9. The data generation apparatus as claimed in claim 6, wherein the processor is further configured to execute:
 respectively transforming the synthesized models into a plurality of depth maps and treating the depth maps as the plurality of training data, wherein the plurality of training data are inputted to a feature vector learner for training.

10. The data generation apparatus as claimed in claim 6, wherein the processor is further configured to execute:
 forming the plurality of training data based on both a changed synthesized model and a real dataset, wherein the real dataset is generated based on a face scanning result.

* * * * *